(12) United States Patent
  Kamachi

(10) Patent No.: US 10,173,614 B2
(45) Date of Patent: Jan. 8, 2019

(54) POWER SUPPLY DEVICE FOR AUXILIARY DEVICE BATTERY

(71) Applicant: MITSUBISHI JIDOSHA KOGYO KABUSHIKI KAISHA, Tokyo (JP)

(72) Inventor: Makoto Kamachi, Okazaki (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 336 days.

(21) Appl. No.: 14/898,836

(22) PCT Filed: Jan. 27, 2014

(86) PCT No.: PCT/JP2014/051705
  § 371 (c)(1),
  (2) Date: Dec. 16, 2015

(87) PCT Pub. No.: WO2014/203549
  PCT Pub. Date: Dec. 24, 2014

(65) Prior Publication Data
  US 2016/0137149 A1    May 19, 2016

(30) Foreign Application Priority Data
  Jun. 17, 2013    (JP) .................... 2013-126351

(51) Int. Cl.
  *B60L 11/18*    (2006.01)
  *H02J 7/02*    (2016.01)
  (Continued)

(52) U.S. Cl.
  CPC .............. *B60R 16/033* (2013.01); *B60L 1/00* (2013.01); *B60L 1/003* (2013.01); *B60L 3/0046* (2013.01);
  (Continued)

(58) Field of Classification Search
  CPC .............. B60L 11/1816; B60L 11/1818; B60L 2210/10; B60L 11/1868; B60L 2210/30;
  (Continued)

(56) References Cited

U.S. PATENT DOCUMENTS

2008/0067973 A1    3/2008  Ishikawa et al.
2010/0019723 A1    1/2010  Ichikawa
  (Continued)

FOREIGN PATENT DOCUMENTS

JP    7-15807 A    1/1995
JP    2001-128378 A    5/2001
  (Continued)

*Primary Examiner* — Ryan Johnson
(74) *Attorney, Agent, or Firm* — Birch, Stewart, Kolasch & Birch, LLP

(57) ABSTRACT

A vehicle mounted charger converts external power into drive power, and supplies the power to a drive battery. A first converter supplies the power to an auxiliary device battery by converting the external power into the power for an auxiliary device. A second converter supplies the power to the auxiliary device battery by converting the drive power which is stored in the drive battery into the power for the auxiliary device. In a normal charging mode, the auxiliary device battery is charged by the first converter. Moreover, in a travelling mode or a rapid charging mode, the auxiliary device battery is charged by the second converter.

10 Claims, 4 Drawing Sheets

(51) Int. Cl.
  *B60R 16/033* (2006.01)
  *B60L 1/00* (2006.01)
  *H02J 5/00* (2016.01)
  *B60L 3/00* (2006.01)
  *B60L 7/14* (2006.01)
  *B60L 11/14* (2006.01)

(52) U.S. Cl.
  CPC ................ *B60L 7/14* (2013.01); *B60L 11/14* (2013.01); *B60L 11/1805* (2013.01); *B60L 11/185* (2013.01); *B60L 11/1811* (2013.01); *B60L 11/1816* (2013.01); *B60L 11/1838* (2013.01); *B60L 11/1859* (2013.01); *B60L 11/1861* (2013.01); *B60L 11/1868* (2013.01); *H02J 5/00* (2013.01); *H02J 7/02* (2013.01); *B60L 2210/10* (2013.01); *B60L 2210/30* (2013.01); *B60L 2230/12* (2013.01); *B60L 2240/547* (2013.01); *B60L 2240/549* (2013.01); *B60L 2250/16* (2013.01); *B60L 2260/22* (2013.01); *B60L 2260/26* (2013.01); *Y02T 10/70* (2013.01); *Y02T 10/7005* (2013.01); *Y02T 10/7044* (2013.01); *Y02T 10/7066* (2013.01); *Y02T 10/7077* (2013.01); *Y02T 10/7088* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01)

(58) Field of Classification Search
  CPC .... B60L 2230/12; B60L 11/185; Y02T 90/14; Y02T 90/121; H02J 7/0042
  See application file for complete search history.

(56) References Cited

U.S. PATENT DOCUMENTS

| | | | |
|---|---|---|---|
| 2011/0187184 A1* | 8/2011 | Ichikawa | B60L 1/003 307/10.1 |
| 2012/0299377 A1 | 11/2012 | Masuda et al. | |
| 2013/0134908 A1 | 5/2013 | Sugiyama et al. | |
| 2013/0314041 A1 | 11/2013 | Proebstle | |
| 2014/0203634 A1* | 7/2014 | Sugiyama | B60L 1/00 307/10.1 |

FOREIGN PATENT DOCUMENTS

| | | |
|---|---|---|
| JP | 2006-50779 A | 2/2006 |
| JP | 2008-206300 A | 9/2008 |
| JP | 2010-200530 A | 9/2010 |
| JP | 2011-55682 A | 3/2011 |
| JP | 2011-72069 A | 4/2011 |
| JP | 2011-223834 A | 11/2011 |
| JP | 2012-244875 A | 12/2012 |
| JP | 2012-249384 A | 12/2012 |

* cited by examiner

POWER SUPPLY DEVICE FOR AUXILIARY DEVICE BATTERY

TECHNICAL FIELD

The present invention relates to a power supply device for an auxiliary device battery supplying power to an auxiliary device battery that is mounted on an electric motor vehicle which travels by using the power.

BACKGROUND ART

In the related art, on an electric motor vehicle such as an electric automobile which travels by using power, a drive battery that stores vehicle drive power (which is referred to as "drive power", hereinafter) at high capacitance and high voltage, and an auxiliary device battery that stores the drive power (which is referred to as "power for auxiliary device", hereinafter) of an auxiliary device within the vehicle at a battery voltage of approximately 12V in general have been mounted. Here, charging of the drive battery is carried out by supplying an external power source (commercial power source) from a charging port which is arranged in a vehicle body of the electric motor vehicle. Moreover, the charging of the auxiliary device battery is carried out by stepping down and supplying the power within the drive battery with a DC/DC converter.

As a power supply device to the auxiliary device battery in the vehicle, for example, a technology such as PTL 1 or PTL 2 described below is known. In an auxiliary battery power feeding system of PTL 1, an auxiliary battery power feeding converter of which capacitance is smaller than that of a main DC/DC converter is included, and the auxiliary battery power feeding converter generates a second low voltage for applying to an auxiliary battery separately from the main DC/DC converter. When the power is fed to the auxiliary battery at the time of stopping the vehicle, a power feeding control circuit applies the second low voltage from the auxiliary battery power feeding converter to the auxiliary battery, by switching and controlling a low pressure path switching unit. Thereby, it is possible to efficiently feed the power to the auxiliary battery.

Moreover, PTL 2 is a power source system in which the charging is possible by using the power from an external power source, and an auxiliary device battery supplies a power source voltage which is lower than an output voltage of a power storage apparatus to an auxiliary device load. A DC/DC converter supplies the power source voltage to the auxiliary device load and the auxiliary device battery, by stepping down the power from the power storage apparatus. An AC/DC converter uses the power from the external power source, and the supply of the power source voltage to a charging ECU and the charging of the auxiliary device battery are possible. Therefore, at the time of the external charging, an HV-ECU controls the charging power of the power storage apparatus and the charging power of the auxiliary device battery, based on a charging state of the auxiliary device battery. Thereby, in the vehicle in which the charging is possible by the external power source, the lowering of charging efficiency at the time of the external charging is suppressed.

CITATION LIST

Patent Literature

[PTL 1] JP-A-2011-055682
[PTL 2] JP-A-2011-223834

SUMMARY OF INVENTION

Technical Problem

In a start of the electric motor vehicle, the power for the auxiliary device which is stored in the auxiliary device battery is used. In the related art described above, when a stored power amount of the auxiliary device battery is less than a startable power amount of the electric motor vehicle, that is, when a "battery death" is generated, there is a problem that a normal start may not be carried out, for example, even in a state where a charging cable is connected to the charging port of the electric motor vehicle. In the related art described above, in such a case, there is a need to make a so-called "jump start" of starting by connecting the auxiliary device battery of the self-vehicle to the auxiliary device batteries of other vehicles, and receiving the supply of the power from the auxiliary device batteries of other vehicles.

The present invention is made in view of the problems of the related art described above, and an object thereof is to make an electric motor vehicle be startable even when a stored power amount of an auxiliary device battery is less than a startable power amount of the electric motor vehicle.

Solution to Problem

In order to solve the problems described above, and to achieve the object, according to an aspect of the present invention, there is provided a power supply device for an auxiliary device battery that is mounted on an electric motor vehicle which travels by using power, including an auxiliary device battery that stores the power for an auxiliary device of the electric motor vehicle, a converter that works by using external power which is supplied from an external power source through a charging cable which is connected to a charging port of the electric motor vehicle, and supplies the power to the auxiliary device battery by converting the external power into the power for the auxiliary device, and an opening and closing switch that is arranged in a circuit which supplies the external power to the converter from the charging cable, and turns on or turns off a connection of the circuit based on an operation of a user.

Advantageous Effects of Invention

According to the present invention, since the converter that works by using the external power which is supplied through the charging cable, and supplies the power to the auxiliary device battery by converting the external power into the power for the auxiliary device is arranged, even when a stored power amount of the auxiliary device battery is less than a startable power amount of the electric motor vehicle, it is possible to make the electric motor vehicle be startable. Therefore, it is possible to convert the external power into the direct power for the auxiliary device by the converter, and it is possible to enhance the charging efficiency, in comparison with a method for charging (converting the external power into the drive power, and further, into the power for the auxiliary device) the auxiliary device battery in the related art.

In the power supply device for an auxiliary device battery according to the present invention, a control unit that works by using the power for the auxiliary device which is stored in the auxiliary device battery, and carries out a control process of the electric motor vehicle, and a start switch that accepts a start operation of the control unit by the user may be included, and when the opening and closing switch, and the start switch are in an ON state, and a stored power amount of the auxiliary device battery is less than a startable power amount of the electric motor vehicle, the external power may be supplied to the converter, and the stored power amount of the auxiliary device battery may be made to be equal to or more than the startable power amount of the electric motor vehicle, and the control unit may be started.

According to the above configuration, even when the stored power amount of the auxiliary device battery is less than the startable power amount of the electric motor vehicle (at the time of the auxiliary device battery death), it is possible to start the electric motor vehicle by taking the external power from the charging cable, and converting the external power into the power for the auxiliary device, and it is possible to enhance the convenience.

Moreover, in the power supply device for an auxiliary device battery according to the present invention, a semiconductor switch that is arranged in a circuit which supplies the external power to the converter from the charging cable, and turns on or turns off a connection of the circuit by a control of the control unit may be included, and the opening and closing switch, and the semiconductor switch may be connected in parallel.

According to the above configuration, since the opening and closing switch, and the semiconductor switch are connected in parallel, it is possible to turn on or to turn off the supply of the external power to the converter from the charging cable by the opening and closing switch instead of the control unit at the time of the auxiliary device battery death.

In the power supply device for an auxiliary device battery according to the present invention, when the stored power amount of the auxiliary device battery is equal to or more than the startable power amount of the electric motor vehicle, the control unit may make an ON-OFF behavior of the opening and closing switch based on the operation of the user be ineffective, and may control an ON-OFF behavior of the semiconductor switch.

According to the above configuration, when the stored power amount of the auxiliary device battery is equal to or more than the startable power amount of the electric motor vehicle, it is possible to prevent the unnecessary charging of the auxiliary device battery due to the erroneous operation of the opening and closing switch of the user.

Additionally, in the power supply device for an auxiliary device battery according to the present invention, an operation switch that is configured by being coupled with the opening and closing switch so as to turn on or turn off the opening and closing switch by being operated by the user may be included, and the operation switch may be installed in the vicinity of the start switch.

According to the above configuration, since the operation switch that accepts an ON-OFF operation of the opening and closing switch by the user is installed in the vicinity of the start switch of the electric motor vehicle, it is possible to sequentially press two switches, and it is possible to enhance operability at the time of the jump start of the electric motor vehicle.

In the power supply device for an auxiliary device battery according to the present invention, an operation switch that is configured by being coupled with the opening and closing switch so as to turn on or turn off the opening and closing switch by being operated by the user may be included, and the operation switch may be installed in the vicinity of the charging port of the electric motor vehicle to which the charging cable is connected.

According to the above configuration, since the operation switch that accepts the ON-OFF operation of the opening and closing switch by the user is installed in the vicinity of the charging port, after the charging cable is connected to the charging port, it is possible to immediately turn on the operation switch, and it is possible to quickly begin the power source supply to the converter.

DESCRIPTION OF EMBODIMENTS

Hereinafter, suitable embodiments of a power supply device for an auxiliary device battery according to the present invention, will be described with reference to the accompanying drawings. In the present embodiments, a power supply system 10 of an electric motor vehicle to which the power supply device for an auxiliary device battery according to the present invention is applied will be described.

Embodiments

Figure 1:
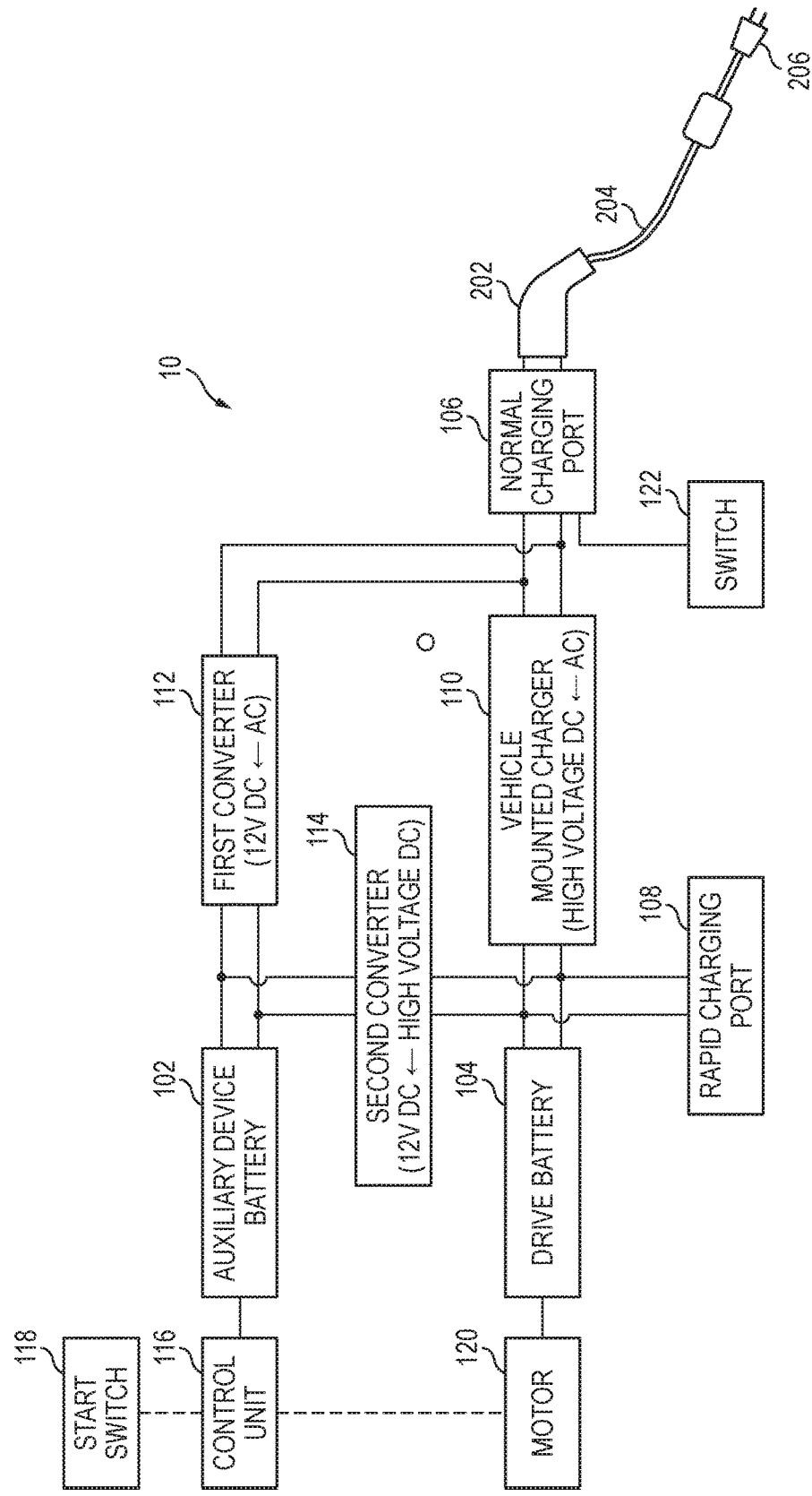
FIG. 1 is a block diagram illustrating a configuration of a power supply system 10 according to an embodiment.

FIG. 1 is a block diagram illustrating a configuration of the power supply system 10 according to an embodiment. The power supply system 10 according to the embodiment, is mounted on the electric motor vehicle which travels by using the power. Here, the electric motor vehicle may be an electric automobile which travels by using only the power, or may be a hybrid automobile (particularly, plug-in hybrid automobile where a charging port is arranged, and the charging from the outside is possible) which travels by using the power and gasoline.

An auxiliary device battery 102 stores the power for an auxiliary device of the electric motor vehicle. For example, the auxiliary device battery 102 is a battery having a relatively low voltage of 12V of a battery voltage, and stores the work power (power for auxiliary device) of the auxiliary device (electrical device such as a car stereo, a car navigation, a power window or a control unit 116 described later) within the electric motor vehicle. The power for the auxiliary device is a direct current of 12V (12V DC). The details thereof will be described later, but the charging of the auxiliary device battery 102 is carried out by converting and supplying external power (household alternating current: AC) which is supplied from a normal charging port 106 into 12V DC with a first converter 112, or by stepping down and supplying the power (high voltage direct current: DC) of a drive battery 104 into 12V DC with a second converter 114.

The drive battery 104 stores the drive power of the electric motor vehicle. For example, the drive battery 104 is a battery having a relatively high voltage of 330V of the battery voltage, and stores the drive power (drive power) of a motor 120 of the electric motor vehicle. The drive power is a high voltage direct current (high voltage DC). The charging of the drive battery 104 is carried out by a normal charging mode of converting and supplying the external power (AC) which is supplied from the normal charging port 106 into the high voltage DC with a vehicle mounted charger 110, or by a rapid charging mode of being charged by the high voltage DC which is supplied from a rapid charging port 108.

The normal charging port 106 is arranged in a vehicle body of the electric motor vehicle, and is connected to a charging cable 204 for the normal charging. In the charging cable 204, a plug 206 which is connected to an external power source being a household commercial power source, is arranged at one end, and a connector 202 which is connected to the normal charging port 106 is arranged at the other end. The connector 202 of the charging cable 204 is connected to the normal charging port 106, and the external power (AC) is supplied from the external power source, and thereby, the normal charging is carried out. Furthermore, the normal charging port 106 corresponds to the "charging port" in the claims of the present application.

The rapid charging port 108 is arranged in the vehicle body of the electric motor vehicle, and is connected to a charging cable (not illustrated) for the rapid charging. The charging cable for the rapid charging, is connected to a power source for the charging of the electric motor vehicle such as a rapid charger. A connector of the charging cable for the rapid charging is connected to the rapid charging port 108, and the high voltage DC is supplied from the power source for the charging, and thereby, the rapid charging is carried out.

Furthermore, the charging of the electric motor vehicle is carried out in a stop mode of the electric motor vehicle (at the time of the non-start of the electric motor vehicle) in any case of the normal charging and the rapid charging.

The vehicle mounted charger 110 converts the external power (AC) that is supplied from the external power source through the charging cable 204 which is connected to the normal charging port 106 of the electric motor vehicle into the drive power (high voltage DC), and supplies the power to the drive battery 104. The vehicle mounted charger 110 converts the external power (AC) into the drive power (high voltage DC) at the time of the normal charging, and is used for charging the drive battery 104.

The first converter 112 supplies the power to the auxiliary device battery 102 by converting the external power (AC) which is supplied through the charging cable 204 into the power for the auxiliary device (12V DC). The first converter 112 corresponds to the "converter" in the claims of the present application. The first converter 112 converts the external power (AC) into the power for the auxiliary device (12V DC) in the normal charging mode, and is used for charging the auxiliary device battery 102. Moreover, the second converter is used for charging the auxiliary device battery 102, at the time of the jump start described later (when the electric motor vehicle is started at the time of the auxiliary device battery death). Furthermore, in order to respond thereto at the time of the jump start, the first converter 112 makes the external current (AC) into the drive power.

Since the first converter 112 converts the external power (AC) into the direct power for the auxiliary device (12V DC), it is possible to enhance the charging efficiency, in comparison with a charging method of converting the external power (AC) into the drive power (high voltage DC), and further, into the power for the auxiliary device (12V DC) in the related art. Moreover, by arranging the first converter 112, since it is possible to charge the auxiliary device battery 102 without driving the second converter 114 in the normal charging mode of which the charging time is long in comparison with the rapid charging, it is possible to shorten the use time of the second converter 114, and it is possible to prevent the deterioration due to the use. Still more, as described later, by arranging the first converter 112, even when the auxiliary device battery death is generated, it is possible to start the electric motor vehicle by connecting the charging cable 204.

Furthermore, the first converter 112 is favorable if having the performance which is necessary in converting the external power (AC) into the power for the auxiliary device (12V DC) at the time of the jump start described later and at the time of the normal charging at a minimum. By using the first converter 112 having such the minimum performance, it is possible to reduce an influence of the cost increase due to the adding of the first converter 112.

The second converter 114 supplies the power to the auxiliary device battery 102 by converting the drive power (high voltage DC) which is stored in the drive battery 104 into the power for the auxiliary device (12V DC). The second converter 114 converts the drive power (high voltage DC) into the power for the auxiliary device (12V DC) at the time of the rapid charging and in a travelling mode, and is used for charging the auxiliary device battery 102.

Furthermore, the vehicle mounted charger 110 and the second converter 114 make the power for the auxiliary device (12V DC) into the drive power, in the same manner as other electrical devices.

The control unit 116 works by using the power for the auxiliary device, and carries out a control process of the electric motor vehicle. Specifically, the control unit 116 is an ECU (Electronic Control Unit) of the electric motor vehicle. Furthermore, the control unit 116 is not limited to one within the electric motor vehicle, and may be plurally arranged per control contents thereof.

A start switch 118 accepts a start operation of the control unit 116 by a user. In the electric motor vehicle, since each of the units (for example, the motor 120, an indication lamp within a dashboard and the like) are controlled by the control unit 116, the start operation of the control unit 116 becomes, that is, the start operation of the electric motor vehicle. For example, the start switch is arranged in the vicinity of the dashboard of a driver's seat.

A switch 122 is a switch that is arranged in a circuit which supplies the external power to the first converter 112 from the charging cable 204, and turns on or turns off the supply of the external power to the first converter 112 (and the vehicle mounted charger 110) from the charging cable 204.

Figure 2:
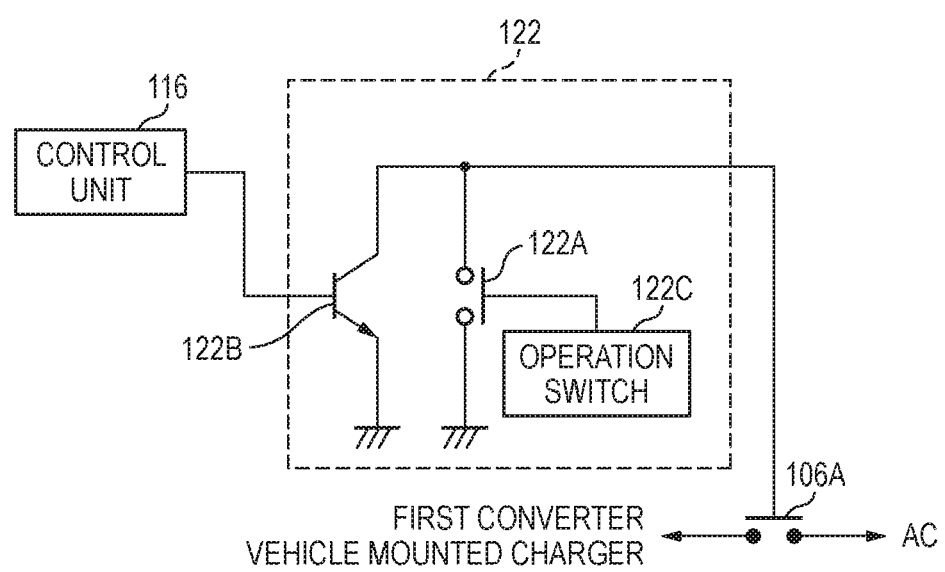
FIG. 2 is an explanatory diagram illustrating a configuration of a switch 122.

FIG. 2 is an explanatory diagram illustrating a configuration of the switch 122.

The switch 122 is configured by a mechanical type opening and closing switch 122A, a semiconductor switch 122B, and an operation switch 122C. The opening and closing switch 122A is arranged in the circuit which supplies the external power to the first converter 112 from the charging cable 204, and turns on or turns off a connection of the circuit based on the operation of the user. The operation of the user is accepted by the operation switch 122C that is configured by being coupled with the opening and closing switch 122A so as to turn on or turn off the opening and closing switch 122A by being operated by the user. Moreover, the semiconductor switch 122B is arranged in the circuit which supplies the external power to the first converter 112 from the charging cable 204, and turns on or turns off the connection of the circuit by the control of the control unit 116.

The opening and closing switch 122A, and the semiconductor switch 122B are connected to a switch 106A in parallel. The switch 106A is turned on or is turned off by being coupled with an ON-OFF state of the opening and closing switch 122A and the semiconductor switch 122B. The switch 106A is arranged at a contact point of the charging cable 204 and the wiring (wiring which is connected to the first converter 112 and the vehicle mounted charger 110) of the electric motor vehicle side. That is, after the charging cable 204 is connected to the normal charging port 106, the opening and closing switch 122A or the semiconductor switch 122B is turned on, and the switch 106A is turned on by being coupled therewith, and thereby, the charging cable 204 and the wiring of the electric motor vehicle side are electrically connected, and the supply of the external power to the first converter 112 and the vehicle mounted charger 110 is started. Furthermore, an installation position of the switch 106A is arbitrary, but for example, it is possible to arrange the switch 106A in the normal charging port 106 or the connector 202.

Here, when the stored power amount of the auxiliary device battery 102 is less than the startable power amount of the electric motor vehicle at the time of the start operation of the electric motor vehicle, that is, when a normal start process is not performed by that the battery death is caused in the electric motor vehicle, the operation switch 122C is operated by the user, namely, at the time of the jump start. Therefore, the opening and closing switch 122A is turned on or is turned off by being coupled with the operation of the operation switch 122C. On the other hand, except for the time of the operation of the operation switch 122C, the supply of the external power to the first converter 112 (and the vehicle mounted charger 110) is turned on or is turned off by the semiconductor switch 122B. In other words, the ON-OFF operation of the opening and closing switch 122A is performed only when the user operates the operation switch 122C if wanting to start the electric motor vehicle in the state where the battery death is caused in the electric motor vehicle, and except for the case, the ON-OFF operation of the switch 106A is controlled by the control of the control unit 116.

Furthermore, the operation switch 122C may be installed in the vicinity (that is, vicinity of the dashboard) of the start switch 118 of the electric motor vehicle, or in the vicinity of the normal charging port 106 of the electric motor vehicle to which the charging cable 204 is connected. If the operation switch 122C is made so as to be installed in the vicinity of the start switch 118 of the electric motor vehicle, it is possible to sequentially press two switches, and it is possible to enhance operability at the time of the jump start of the electric motor vehicle. Moreover, if the operation switch 122C is made so as to be installed in the vicinity of the normal charging port 106, after the charging cable 204 is connected to the normal charging port 106, it is possible to immediately turn on the operation switch 122A, and it is possible to quickly begin the power source supply to the first converter 112.

Next, the power supply to each battery in the power supply system 10 will be described.

Figure 3:
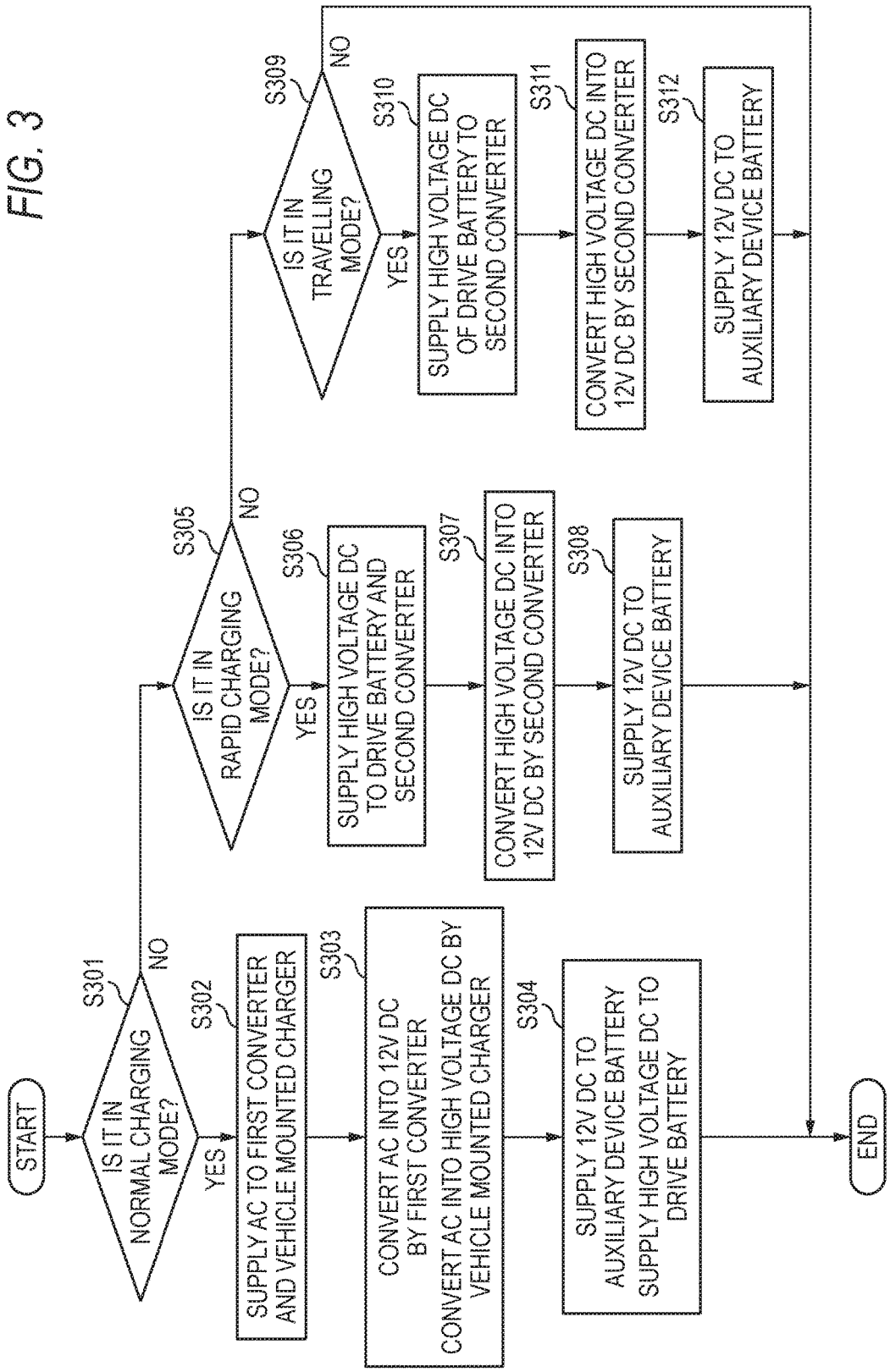
FIG. 3 is a flowchart illustrating a power supply process of each battery in the power supply system 10.

FIG. 3 is a flowchart illustrating a power supply process of each battery in the power supply system 10. First, the normal charging will be described. If the charging cable 204 is connected to the normal charging port 106, the switch 122 (normally, the semiconductor switch 122B) is turned on, and is in the normal charging mode (step S301: Yes).

The external power (AC) which is supplied from the normal charging port 106, is supplied to the first converter 112 and the vehicle mounted charger 110 (step S302). In the first converter 112, the external power (AC) is converted into the power for the auxiliary device (12V DC), and in the vehicle mounted charger 110, the external power (AC) is converted into the drive power (high voltage DC) (step S303).

Therefore, the power for the auxiliary device (12V DC) which is converted by the first converter 112 is supplied to the auxiliary device battery 102, and the drive power (high voltage DC) which is converted by the vehicle mounted charger 110 is supplied to the drive battery 104, respectively (step S304). The process according to the present flowchart is ended. The power which is supplied to each battery, is stored as the power for the auxiliary device or the drive power.

Next, the rapid charging will be described. A charging cable (not illustrated) for the rapid charging is connected to the rapid charging port 108, and if the rapid charger is turned on, the rapid charging mode is made (step S305: Yes).

The high voltage DC which is supplied from the rapid charging port 108, is supplied to the drive battery 104 and the second converter 114 (step S306). The high voltage DC which is supplied to the drive battery 104, is intactly stored in the drive battery 104 as the drive power. Moreover, in the second converter 114, the high voltage DC is converted into the power for the auxiliary device (12V DC) (step S307).

Therefore, the power for the auxiliary device (12V DC) which is converted by the second converter 114, is supplied to the auxiliary device battery 102 (step S308), and the process according to the present flowchart is ended. The power which is supplied to the auxiliary device battery 102, is stored as the power for the auxiliary device.

Next, the process of the travelling mode will be described. In the travelling mode (start mode) of the electric motor vehicle (step S309: Yes), the power is supplied to the auxiliary device or the motor 120 from each battery, and the stored power amount of the battery is reduced. In the travelling mode of the electric motor vehicle, the charging from the charging port is not carried out with respect to the drive battery 104, and the power that is generated by a generator (not illustrated) using the regenerative force of the electric motor vehicle is supplied, and the reduced power is replenished.

Moreover, in the traveling mode of the electric motor vehicle, the stored power amount of the drive battery 104 is supplied to the auxiliary device battery 102. First, the high voltage DC which is stored in the drive battery 104, is supplied to the second converter 114 (step S310). The second converter 114 converts the high voltage DC into the power for the auxiliary device (12V DC) (step S311). Therefore, the power for the auxiliary device (12V DC) which is converted by the second converter 114, is supplied to the auxiliary device battery 102 (step S312), and the process according to the present flowchart is ended.

Next, the start process of the electric motor vehicle will be described.

Figure 4:
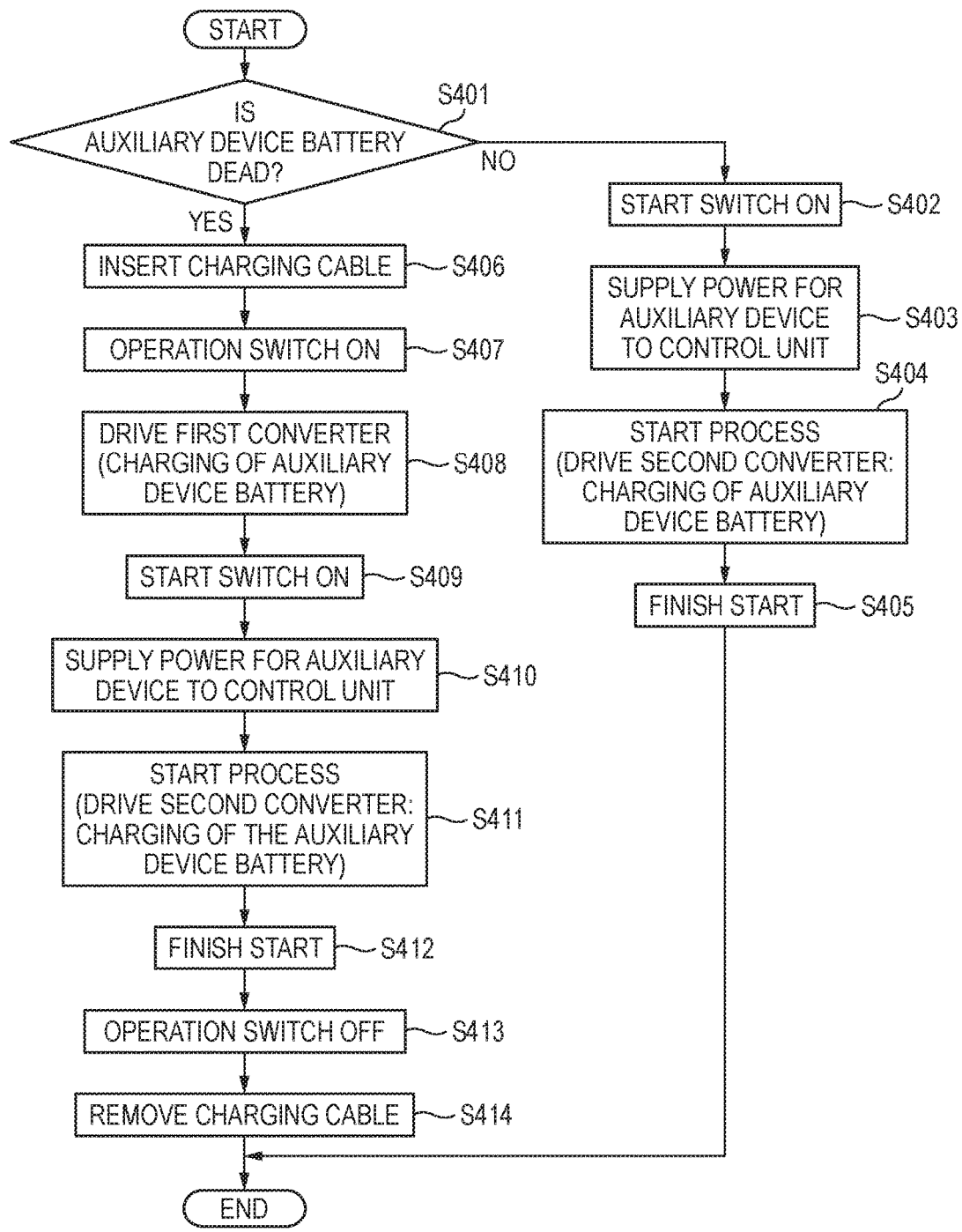
FIG. 4 is a flowchart illustrating a start process of an electric motor vehicle.

FIG. 4 is a flowchart illustrating the start process of the electric motor vehicle. In the present flowchart, a process "at the time of the normal start" in the case where the stored power amount of the auxiliary device battery 102 is equal to or more than the startable power amount of the electric motor vehicle, and a process "at the time of the jump start" in the case where the stored power amount of the auxiliary device battery 102 is less than the startable power amount of the electric motor vehicle (12V battery death) will be described.

At the beginning, it is determined whether or not the stored power amount of the auxiliary device battery 102 is less than the startable power amount of the electric motor vehicles, that is, whether or not the battery death of 12V is generated (step S401). When the battery death of 12V is not generated (step S401: No), the normal start process is carried out. First, the start switch 118 is turned on by the user (step S402). By the ON operation of the start switch 118, the power for the auxiliary device of the auxiliary device battery 102 is supplied to the control unit 116 (step S403).

The control unit 116 works by using the power for the auxiliary device, and the start process (execution of a start program) is carried out (step S404). At that time, the power for the auxiliary device is supplied to the second converter 114, and the driving of the second converter 114 is started, and the charging to the auxiliary device battery 102 from the drive battery 104 is also started. If the start process is finished (step S405), the process according to the present flowchart is ended.

On the other hand, when the battery death of 12V is generated (step S401: Yes), the jump start process is carried out. At that time, a notification (for example, a display of an indicator within the dashboard or the like) of the case where the battery death of 12V is generated, is made to the user. First, the charging cable 204 is inserted into the normal charging port 106 by the user (step S406).

Next, the operation switch 122C is turned on by the user (step S407). Thereby, the opening and closing switch 122A is turned on, and furthermore, the switch 106A is turned on (see FIG. 2), and the charging cable 204 and the wiring of the electric motor vehicle side are electrically connected, and the external power is supplied to the first converter 112. The charging of the auxiliary device battery 102 is possible by driving the first converter 112 (step S408).

Subsequently, the start switch 118 is turned on by the user (step S409). By the ON operation of the start switch 118, the power for the auxiliary device of the auxiliary device battery 102 is supplied to the control unit 116 (step S410). At that time, since the charging of the auxiliary device battery 102 is already started in step S408, it is possible to supply the power for the auxiliary device to the control unit 116.

The control unit 116 works by using the power for the auxiliary device, and the start process (execution of the start program) is carried out (step S411). At that time, the power for the auxiliary device is supplied to the second converter 114, and the driving of the second converter 114 is started, and the charging to the auxiliary device battery 102 from the drive battery 104 is also started. If the start process is finished (step S412), the user turns off the operation switch 122C (step S413). Thereby, the opening and closing switch 122A is also turned off. Furthermore, the OFF operations of the operation switch 122C and the opening and closing switch 122A are not carried out by the operation of the user, and may be automatically carried out in association with establishment of a predetermined condition (for example, the case where the predetermined time is elapsed since the operation switch 122C is turned on, or the case where the stored power amount of the auxiliary device battery 102 is equal to or more than a predetermined amount). Therefore, the user removes the charging cable 204 from the normal charging port 106 (step S414), and the process according to the present flowchart is ended.

As described above, in the power supply system 10 according to the embodiments, since the first converter 112 that supplies the power to the auxiliary device battery 102 by converting the external power which is supplied through the charging cable 204 into the power for the auxiliary device (12V DC) is arranged, it is possible to convert the external power (AC) into the direct power for the auxiliary device (12V DC), and it is possible to enhance the charging efficiency, in comparison with the method for charging (converting the external power into the drive power, and further, into the power for the auxiliary device) the auxiliary device battery 102 in the related art.

In the power supply system 10, since the charging of the auxiliary device battery 102 is carried out by using the first converter 112 in the normal charging mode, it is possible to charge the auxiliary device battery without driving the second converter 114 in the normal charging mode, and it is possible to shorten the use time of the second converter 114, and it is possible to lengthen a durable period of the second converter 114.

Still more, in the power supply system 10, even when the stored power amount of the auxiliary device battery 102 is less than the startable power amount of the electric motor vehicle (at the time of the auxiliary device battery death), it is possible to start the electric motor vehicle by taking the external power from the charging cable 204, and converting the external power into the power for the auxiliary device, and it is possible to enhance the convenience at the time of the auxiliary device battery death.

Additionally, in the power supply system 10, since the opening and closing switch 122A, and the semiconductor switch 122B are connected in parallel, it is possible to turn on or to turn off the supply of the external power to the first converter 112 from the charging cable 204 by the opening and closing switch (operation of the user) instead of the control unit 116 at the time of the auxiliary device battery death.

Moreover, in the power supply system 10, if the operation switch 122C is made so as to be installed in the vicinity of the start switch 118 of the electric motor vehicle, it is possible to sequentially press two switches, and it is possible to enhance the operability at the time of the jump start of the electric motor vehicle. Still more, in the power supply system 10, if the operation switch 122C is made so as to be installed in the vicinity of the normal charging port 106, after the normal charging port 106 is connected to the charging cable 204, it is possible to immediately turn on the operation switch 122A, and it is possible to quickly begin the power source supply to the first converter 112.

REFERENCE SIGNS LIST 10 power supply system
102 auxiliary device battery
104 drive battery
106 normal charging port
106A switch
108 rapid charging port
110 vehicle mounted charger
112 first converter
114 second converter
116 control unit
118 start switch
120 motor
122 switch
122A operation switch
122B semiconductor switch
122C operation switch
202 connector
204 charging cable
206 plug

The invention claimed is:
1. A power supply device for an auxiliary device battery that is mounted on an electric motor vehicle which travels by using power, comprising:

an auxiliary device battery that stores the power for an auxiliary device of the electric motor vehicle;
a converter that works by using external power which is supplied from an external power source through a charging cable which is connected to a charging port of the electric motor vehicle, and supplies the power to the auxiliary device battery by converting the external power into the power for the auxiliary device;
an opening and closing switch that is arranged in a circuit which supplies the external power to the converter from the charging cable, and turns on a connection of the circuit based on an operation of a user when a stored amount of the auxiliary device battery is less than a startable power amount of the electric motor vehicle;
a control unit that works by using the power for the auxiliary device which is stored in the auxiliary device battery, and carries out a control process of the electric motor vehicle; and
a start switch that accepts a start operation of the control unit by the user,
wherein when both of the opening and closing switch and the start switch are in an ON state, and the stored power amount of the auxiliary device battery is less than the startable power amount of the electric motor vehicle, the converter supplies the external power to the auxiliary device battery, and makes the stored power amount of the auxiliary device battery be equal to or more than the startable power amount of the electric motor vehicle so that the control unit is started.

2. The power supply device for an auxiliary device battery according to claim 1, further comprising:
a semiconductor switch that is arranged in a circuit which supplies the external power to the converter from the charging cable, and turns on or turns off a connection of the circuit by a control of the control unit,
wherein the opening and closing switch and the semiconductor switch are connected in parallel.

3. The power supply device for an auxiliary device battery according to claim 2,
wherein when the stored power amount of the auxiliary device battery is equal to or more than the startable power amount of the electric motor vehicle, the control unit makes an ON-OFF behavior of the opening and closing switch based on the operation of the user be ineffective, and controls an ON-OFF behavior of the semiconductor switch.

4. The power supply device for an auxiliary device battery according to claim 1, further comprising:
an operation switch that is configured by being coupled with the opening and closing switch so as to turn on or turn off the opening and closing switch by being operated by the user,
wherein the operation switch is installed in a vicinity of the start switch.

5. The power supply device for an auxiliary device battery according to claim 2, further comprising:
an operation switch that is configured by being coupled with the opening and closing switch so as to turn on or turn off the opening and closing switch by being operated by the user,
wherein the operation switch is installed in a vicinity of the start switch.

6. The power supply device for an auxiliary device battery according to claim 3, further comprising:
an operation switch that is configured by being coupled with the opening and closing switch so as to turn on or turn off the opening and closing switch by being operated by the user,
wherein the operation switch is installed in a vicinity of the start switch.

7. The power supply device for an auxiliary device battery according to claim 1, further comprising:
an operation switch that is configured by being coupled with the opening and closing switch so as to turn on or turn off the opening and closing switch by being operated by the user,
wherein the operation switch is installed in a vicinity of the charging port of the electric motor vehicle to which the charging cable is connected.

8. The power supply device for an auxiliary device battery according to claim 2, further comprising:
an operation switch that is configured by being coupled with the opening and closing switch so as to turn on or turn off the opening and closing switch by being operated by the user,
wherein the operation switch is installed in a vicinity of the charging port of the electric motor vehicle to which the charging cable is connected.

9. The power supply device for an auxiliary device battery according to claim 3, further comprising:
an operation switch that is configured by being coupled with the opening and closing switch so as to turn on or turn off the opening and closing switch by being operated by the user,
wherein the operation switch is installed in a vicinity of the charging port of the electric motor vehicle to which the charging cable is connected.

10. A power supply device for an auxiliary device battery that is mounted on an electric motor vehicle which travels by using power, comprising:
an auxiliary device battery that stores the power for an auxiliary device of the electric motor vehicle;
a converter that works by using external power which is supplied from an external power source through a charging cable which is connected to a charging port of the electric motor vehicle, and supplies the power to the auxiliary device battery by converting the external power into the power for the auxiliary device;
an opening and closing switch that is arranged in a circuit which supplies the external power to the converter from the charging cable, and turns on a connection of the circuit based on an operation of a user;
an operation switch that is configured by being coupled with the opening and closing switch so as to turn on or turn off the opening and closing switch by being operated by the user,
wherein the operation switch is installed in a vicinity of the charging port of the electric motor vehicle to which the charging cable is connected.

* * * * *